(12) United States Patent
Vor Dem Esche et al.

(10) Patent No.: US 9,985,437 B2
(45) Date of Patent: May 29, 2018

(54) COMBINED ELECTRICAL POWER PLANT

(71) Applicant: Enrichment Technology Company Ltd., Zweigniederlassung Deutschland, Jülich (DE)

(72) Inventors: Rainer Vor Dem Esche, Heinsberg (DE); Christoph Treppmann, Aachen (DE); Thilo Engelmann, Jülich (DE)

(73) Assignee: ENRICHMENT TECHNOLOGY COMPANY LTD., ZWEIGNIEDERLASSUNG DEUTSCHLAND (DE)

( * ) Notice: Subject to any disclaimer, the term of this patent is extended or adjusted under 35 U.S.C. 154(b) by 812 days.

(21) Appl. No.: 14/497,588

(22) Filed: Sep. 26, 2014

(65) Prior Publication Data
US 2016/0094035 A1    Mar. 31, 2016

(51) Int. Cl.
*H02J 3/28* (2006.01)
*H02J 3/30* (2006.01)
*H02J 13/00* (2006.01)

(52) U.S. Cl.
CPC .............. *H02J 3/28* (2013.01); *H02J 3/30* (2013.01); *H02J 13/002* (2013.01); *H02J 13/0062* (2013.01); *H02J 13/0075* (2013.01); *Y02E 60/16* (2013.01); *Y02E 60/722* (2013.01); *Y02E 60/7815* (2013.01); *Y02E 60/7838* (2013.01); *Y02E 60/7853* (2013.01); *Y04S 10/14* (2013.01); *Y04S 40/121* (2013.01); *Y04S 40/124* (2013.01); *Y04S 40/126* (2013.01)

(58) Field of Classification Search
CPC .................................. H02J 3/30; H02J 13/002
See application file for complete search history.

(56) References Cited

U.S. PATENT DOCUMENTS

| | | | | |
|---|---|---|---|---|
| 7,274,975 B2* | 9/2007 | Miller | ................... | G06Q 50/06 700/295 |
| 8,008,804 B2* | 8/2011 | Capp | ...................... | H02J 3/30 307/44 |
| 8,754,547 B2* | 6/2014 | Jin | ............................. | H02J 3/28 307/103 |
| 9,436,179 B1* | 9/2016 | Turney | ................... | G05B 23/02 |
| 9,559,520 B2* | 1/2017 | Shelton | ................... | H02J 3/381 |

(Continued)

*Primary Examiner* — Thienvu Tran
*Assistant Examiner* — Pinping Sun
(74) *Attorney, Agent, or Firm* — Tarolli, Sundheim, Covell & Tummino LLP

(57) ABSTRACT

A combined electrical power plant is provided to supply power to a grid and a method to operate such a combined electrical power plant comprising a thermal power generation facility and an energy storage facility with a suitable energy storage capacity being able to supply additional electrical power to the grid and to receive and store electrical power from the thermal power generation facility or from the grid. Both facilities are electrically coupled to providing a combined power output to the grid and further comprise a plant controller to process the demand signal and to generate at least a first control signal and a second control signal from the demand signal, where the first control signal is a smoothened function of time of the demand signal resulting from a smoothening process executed by the plant controller taking into account operational characteristics of the thermal power generation facility.

26 Claims, 3 Drawing Sheets

(56) References Cited

U.S. PATENT DOCUMENTS

| | | | |
|---|---|---|---|
| 2004/0020206 A1 | 2/2004 | Sullivan et al. | |
| 2004/0230343 A1* | 11/2004 | Zalesski | H02J 1/102 700/297 |
| 2004/0263116 A1* | 12/2004 | Doruk | F01K 13/00 320/107 |
| 2008/0211230 A1* | 9/2008 | Gurin | B60L 11/1861 290/2 |
| 2008/0224541 A1* | 9/2008 | Fukuhara | H02J 3/32 307/48 |
| 2009/0078401 A1* | 3/2009 | Cichanowicz | F01K 17/04 165/299 |
| 2009/0189456 A1* | 7/2009 | Skutt | B60L 11/1842 307/87 |
| 2010/0138058 A1* | 6/2010 | Kirchner | F03D 7/0284 700/286 |
| 2011/0273129 A1* | 11/2011 | Coe | H02J 7/007 320/101 |
| 2012/0223678 A1* | 9/2012 | Yokoura | H01M 10/4207 320/128 |
| 2013/0035802 A1* | 2/2013 | Khaitan | G06F 1/263 700/297 |
| 2014/0102073 A1* | 4/2014 | Pang | F01K 3/00 60/39.182 |
| 2014/0103726 A1* | 4/2014 | Martin | H02M 7/493 307/65 |
| 2014/0142776 A1* | 5/2014 | Nielsen | G06F 1/26 700/295 |
| 2014/0142779 A1* | 5/2014 | Stoettrup | H02J 3/28 700/297 |
| 2014/0184136 A1* | 7/2014 | Ture | H02J 7/0052 320/101 |
| 2015/0019034 A1* | 1/2015 | Gonatas | H01L 31/02021 700/291 |
| 2015/0318701 A1* | 11/2015 | vor dem Esche | H02J 3/30 307/19 |
| 2015/0326023 A1* | 11/2015 | Adelberger | H02J 5/00 307/24 |
| 2016/0013652 A1* | 1/2016 | Li | H02J 3/32 307/24 |
| 2016/0146118 A1* | 5/2016 | Wichmann | F02C 9/50 701/100 |

\* cited by examiner

COMBINED ELECTRICAL POWER PLANT

FIELD OF THE INVENTION

The present invention relates to a combined electrical power plant to supply power to a grid in accordance to a demand signal and a method to operate such a combined electrical power plant.

BACKGROUND OF THE INVENTION

The transmission of electrical power is a transfer of electrical energy generated by power plants to electrical substations located near demand centres via transmission lines. Such transmission lines might be interconnected with each other forming a transmission network. Such network is known as power grid, national grid or transmission grid, or just "the grid". The grid interconnects large geographic areas, where a large number of power plants comprising generators deliver AC power with the same relative phase to a large number of consumers. These grids are operated by a control system comprising grid operators. The grid operator maintains the security of the grid by balancing the supply and the demand of energy to/from the grid. In order to achieve a stable balance between supply and load, the operator has to forecast the expected load and has to ensure, that enough power plants are available to supply the required energy to the grid. In order to ensure the required supply, the operator determines an optimal combination of power generating facilities and power reserve providers. The operator specifies which power plant out of the available power plants has to deliver which amount of energy in which period of time. The power plants offer amounts of energy they are able to supply in a market trading period and the operator specifies time and amount of energy to be delivered in a demand signal. If the supplied power deviates from the demand signal, the power plant will be charged from this deviation.

In the past large conventional power plants of typically more than 50 MW per power plant supplied the majority of the demanded energy to the grid. The daily load curve could be predicted very well, thus demand signals (power delivery schedule as a function of time) could be set-up 24 h in beforehand resulting in a reliable power supply and an easy manageable balancing control. The deviation of predicted demand and current supply remain small and could be compensated by slightly ramping-up or ramping-down of the conventional power plants. Conventional power plants are power plants generating the electrical power from thermal processes and are denoted as thermal power generation plants or facilities in the following, such as coal-fired, gas-fired or nuclear power plants.

Currently the amount of regenerative energy supplied to the grid by wind farms or photovoltaic plants increases significantly. The regenerative energy power plants provide a very fast response rate, however these power plants cannot guarantee to deliver a specified amount of energy at an appointed point of time in the future due to environmental uncertainties. The increased supply of regenerative energy to the grid results in a decreasing amount of predictable supply capacities of the contributing power plants provided by the so-called conventional or thermal power generation facilities (plants). In case of a short term decrease of regenerative energy due to less wind or less sunshine, the conventional power plants have to compensate the gap in short time. However typical conventional power plants have too slow response rates to compensate such gaps in short terms. Currently conventional power plants solve this issue be adapted turbines comprising steam valves or steam reservoirs.

US 2004/0020206 A1 discloses a steam turbine operated power plant comprising a primary and a secondary source of output power, where a large gas turbine is used to provide the majority of the demanded power having a lower response time and a small gas turbine to enable a faster ramping-up of the delivered power due to its faster response time until the large turbine takes over the power supply after having finished its ramping up phase. However when further increasing the amount of regenerative energies feeding the grid even the response rate of the small gas turbine will be too slow to compensate short term fluctuations of generative regenerative energy due to variations of the environmental conditions. Furthermore, the disclosed gas turbines cannot compensate overshoots of delivered energy compared to the demanded energy during operation of the conventional power plants, because such power sources cannot store energy.

For this reason it is desirable to provide a thermal power generation plant (conventional power plant) being able to reliable deliver the demanded power to the grid in accordance to any demand signal even in case of demand signals comprising steep rising and/or falling edges.

SUMMARY OF THE INVENTION

It is the object of the present invention to provide a thermal power generation plant being able to reliable deliver the demanded power to the grid in accordance to any demand signal even in case of demand signals comprising steep rising and/or falling edges.

This object is solved by a combined electrical power plant connected to an electrical grid to supply electrical power to the grid comprising a thermal power generation facility having a response time to supply a demanded amount of electrical power to the grid, which is limited by a thermal process, an energy storage facility with a suitable energy storage capacity being able to supply additional electrical power to the grid and to receive and store electrical power from the thermal power generation facility or from the grid, both facilities are electrically coupled to providing a combined power output to the grid according to a demand signal specifying the demanded amount of power as a function of time between a first and a second point of time to be supplied to the grid, and a plant controller to process the demand signal and to generate at least a first control signal and a second control signal from the demand signal, where the first control signal is a smoothened function of time of the demand signal resulting from a smoothening process executed by the plant controller taking into account operational characteristics of the thermal power generation facility to operate the thermal power generation facility under improved conditions, and to transmit the first control signal to the thermal power generation facility to supply power to the grid in accordance with the first control signal, and to transmit the second control signal to the energy storage facility to supply or to receive power in accordance to the second control signal being adapted to provide the combined power output in accordance with the demand signal, where the capacity of the energy storage facility is adapted to nominal power and ramp rate characteristics of the thermal power generation facility in order to at least minimize differences between demand signal and the provided combined power output at any point in time between the first and second points of time.

The term "combined electrical power plant" denotes a power plant comprising a main power source (thermal power generation facility), where power is generated from fossil fuels or radioactive material, and an energy storage facility for storing or supplying power additional to the power supplied by the main power source. The sum of both supplied powers or the power supplied by the main power source minus the power simultaneously stored in the energy storage facility is denotes as combined power output supplied into the connected grid. The thermal power generation facility denotes all power sources using fossil fuels or radioactive material to generate electrical energy via a thermal process utilizing steam turbines. The thermal process denotes the transformation of the energy stored in the fossil fuels or radioactive material into pressurized steam passing a turbine in order to generate electrical current. Due to the required thermal processes, which have to be initialized, intensified and maintained for power generation, such thermal power generation facilities have a limited response time denoting the time to ramp-up the power from zero output to a desired output. A corresponding behavior might be present during ramping down. The combined electrical power plant according to the present invention might be one element of the group of coal-fired power station, gas fired power station or nuclear power station. In a preferred embodiment the thermal power generation facility has a maximum output power of more than 5 MW. The grid, where the combined electrical power plant is connected to, denotes a high voltage power grid, national grid or transmission grid operated typically at 110 KV or more such as 230 kV or 400 kv. The grid interconnects large geographic areas, where a large number of power plants comprising generators deliver AC power with the same relative phase to a large number of consumers and is operated by a control system comprising one or more grid operators.

The term "energy storage facility" denotes any suitable energy storage device or arrangement, which is able to store and supply energy/power having a very fast response rate, typically below a few seconds for storing/delivering the demanded power, at least 1 MW up to 20 MW. The response rate of the energy storage facility is significantly faster than the response rate of the thermal power generation facility. Suitable energy storage devices might by battery storage facilities, compressed air storage facilities, super capacitors or flywheel storage facilities. These storage facilities have an energy storage capacity adapted to be able to significantly support the combined power output at least during the ramping up phase and/or ramping down phase denoting the time interval, where the thermal power generation facility increases its power output to a desired value.

The demand signal specifies the demanded power output of the combined electrical power plant to the grid as a function of time between a first and a second point of time. The demanded signal comprises at least the power plant schedule to deliver power to the grid, which typically specifies a certain power level on a longer time scale and the required power for operating the power plant components. The power plant schedule is a function of power over time, which usually does not vary on short time scale, e.g. a few minutes time scale. The demand signal may further comprise an additional varying power demand in order to provide demanded operating reserve. The operating reserve may vary on a minute scale and requires fast adapting of the combined power output. The demand signal may be established by the operator of the combined electrical power plant derived from received and/or scheduled power output. In case of supplying additional operating reserve, the demand signal is a combination of a signal according to the power plant schedule and a signal according to the demanded operating reserve. Here the operator of the power plant may combine both signals to the demanded signal transmitted to the plant controller. In an alternative procedure the plant controller may receive the demanded operating reserve directly from an external control system connected to the combined power plant and derives the demanded signal from combining the power plant schedule and a signal specifying the demanded operating reserve. In an alternative procedure the plant controller may receive the demand signal from an external control system already comprising the power plant schedule and the signal specifying the demanded operating reserve. The demand signal comprising the power plant schedule and the signal specifying the demanded operating reserve typically shows a superposition of power fluctuations of the demanded output power on a minute time scale (operating reserve) and on a far longer time scale (power plant schedule). The demand signal may demand a constant level of power supplied to the grid within a certain time interval between a starting point of time of power supply (first point of time) and the end of the power supply (second point of time) provided by this particular power plant. The demand signal might be visualized by a graph specifying to be delivered power as a function of time.

The plant controller denotes any suitable processor, computer device or computer system able to execute mathematical calculations based on the demand signal as input data. The plant controller generates at least a first and a second control signal as output data resulting from the calculation process based on the demand signal. The first and second control signals might be transferred to sub-controller operating the thermal power generation facility and/or the energy storage facility or the plant controller operates the thermal power generation facility and/or the energy storage facility as a central controller. In the latter case the transferred first and second control signals are control signals to operate the thermal power generation facility and the energy storage facility directly. The transmission of the first and second control signals might be performed via a data cable or wireless with a suitable technique. In case of more facilities contributing to the combined power output with the combined electrical power plant, the plant controller may generate further control signals such as a third control signal, fourth control signal etc.

The smoothening process in order to at least generate a suitable first control signal may apply any suitable mathematical algorithm able to deliver a first control signal, which specifies operating conditions for the thermal power generation facility, which are considered as improved condition taking into account the operational characteristics of the particular thermal power generation facility. Such operational characteristics might be accessible for the plant controller via look-up tables stored in the plant controller. The operation conditions are considered as improved operation conditions in case of operation conditions being within a safety operation range, where the thermal power generation facility can be operated without any damage or increase maintenance effort.

In an ideal case, the combined power output is identical to the demand signal. However power plants supplying power on large scale, where the supplied power may slightly vary around an average value. Therefore the plant controller at least minimizes any occurring differences between demand signal and the provided combined power output at any point in time between the first and second points of time. The differences between demand signal and the provided combined power output can be significantly smaller for the combined electrical power plant according to the present invention compared to conventional power plants due to the contributing energy storage facility using the very fast response rate of the energy storage facility in order to boost the ramping up characteristic of the combined electrical power plant compared to insufficiently long ramping up characteristics of conventional power plants to cope with the increasing amount of regenerative energy plants supplying an non-predictable amount of power to the grid. Furthermore the combined electrical power plant according to the present invention is able to compensate overshoots of power output from the thermal power generation facility by storing the "overshoot" in the energy storage facility, because the energy storage facility is able to applied fast switches forth and back between power-supply mode and energy storage mode. The storage of overshoots will reduce the overall $CO_2$-emission of the combined electrical power plant.

Therefore the combined electrical power plant according to the present invention provides a power plant being able to reliable deliver the demanded power to the grid in accordance to any demand signal even in case of demand signals comprising steep rising and/or falling edges.

In an embodiment the smoothening process applies a filter algorithm using at least one element of the group of band-pass filter, low-pass filter, high-pass filter, look-up tables, averaging the demand signal in sub-time ranges. In case of demand signals with fluctuating demand power, the fluctuations can be characterized by certain frequencies, a high frequency assigned to operation reserve and a low frequency assigned to power plant schedule. An applied band-pass filter allows signals within a selected range of frequencies while preventing unwanted frequencies from getting through. In this application the allowed frequencies e.g. denote ramp rates for the thermal power generation facility, which will be acceptable for the thermal power generation facility preventing the turbines and generators from being stressed or even damaged in order to minimize the maintenance effort and guarantee long operational lifetime for the thermal power generation facility. Acceptable ranges or data may be accessible via look-up tables stored in the plant controller. Additionally or alternatively high-pass filters (allow high frequencies to pass), low-pass filters (allow low frequencies to pass) or averaging algorithms might be applied in order to separate the original demand signal into resulting signals comprising mainly high or low frequencies, where the signal comprising low frequencies will be used or further processed into the first control signal. In case of demand signals simply specifying a demanded constant power output within a time range, look-up table might be used to directly convert the demand signal into a first and second control signal, where the first control signal is adapted to operate the thermal power generation facility under optimized conditions, e.g. to minimize the maintenance effort and guarantee long operational lifetime for the thermal power generation facility. In an embodiment the smoothening process is repeated until the resulting first control signal provides response rates, power ramp rates and/or comprises nominal power values achievable with the thermal power generation facility within normal operation conditions and operation dynamics of the thermal power generation facility. The favorable operation conditions and operation dynamics of the thermal power generation facility are known by the power generation facility operator. Due to the existing large variety of different power generation facilities the favorable operation conditions and operation dynamics have to be defined for each thermal power generation facility individually by the corresponding power generation facility operator.

In an embodiment the first control signal is adapted to minimize the $CO_2$-Emission of the combined electrical power plant during power generation to supply power in accordance to the demand signal. There might be certain conditions delivering power at minimum $CO_2$-emission per power unit. Operating the thermal power generation facility within this favorable operation range will reduce $CO_2$-emission. If the demanded power output according to the demand signal specifies a power output outside this favorable operation range, the energy storage facility will supply additional power to close the gap between favorable operation range and demanded power output.

In an embodiment the plant controller is connected to the energy storage facility via a data connection receiving load data send-out by the energy storage facility about the current energy stored in the energy storage facility as a load feedback signal and takes into account the load feedback signal within the smoothening process for generation of first and second control signals. The load data about the current energy stored in the energy storage facility enables the plant provider to effectively schedule power supply and energy storage in the energy storage device to optimize the first control signal. In a preferred embodiment the load feedback signal is send-out and received periodically in order to be able to incorporate updated values in the generation of the first and second control signals.

In an embodiment the plant controller adapts the first control signal between first and second point in time to achieve a level of energy stored in the energy storage facility above a lower threshold value at least at the second point of time. In a preferred embodiment the plant controller further adapts the first control signal between first and second point in time to achieve a level of energy stored in the energy storage facility below an upper threshold value at least at the second point of time. In a more preferred embodiment the level is adapted to 40-60% of the capacity of the energy storage facility after the thermal power generation facility passed a ramp-up phase, at least after passing the second point in time. This provides a reserve energy in the energy storage facility for eventually support demanded further ramping up of the power output.

In an embodiment the combined electrical power plant further comprises a point of connection to establish an electrical connection for providing the combined power output to the grid, wherein the point of connection is connected via a first power line to the thermal power generation facility and via a second power line to the energy storage facility, further comprising at least one measuring unit connected to the plant controller to monitor the power in the first power line supplied by the thermal power generation facility and being connected to the plant controller via another data connection to provide a first power line feedback signal to the plant controller, which is arranged to suitably adapt at least the second control signal in response to the first power line feedback signal in order to minimize differences between demand signal and the provided combined power output. The second power line comprises one or more transformers to convert the voltage level at the energy storage facility, typically at 400V to the power level of the first power line, which is typically at 110 kV. In an example, the power may be transformed up to 110 kV with two transformers performing a two-step process firstly increasing the voltage from 400V to 6 kV and secondly increasing the voltage of the second power line from 6 kV to 110 kV.

In alternative embodiments people skilled in the art may apply a one-step transformation process of uses more than two transformation steps. The measuring unit is any suitable device, e.g. an electric meter, to determine the actual power supplied via the first power line with an accuracy adapted to the capacity of the energy storage facility, e.g. of 1 kV in case of a capacity of the energy storage facilities of 1 MW or of 20 kV in case of a capacity of the energy storage facilities of 20 MW. In a preferred embodiment the first power line feedback signal is provided periodically or continuously to the plant controller. The first and second power lines might be conventional power lines typically used in power plants to transmit power.

In an embodiment the energy storage facility comprises a plurality of flywheels to supply or store the energy received from the thermal power generation facility or from the grid. Flywheels storage systems allow frequent load changes and loading cycles without reducing the operational lifetime of the flywheels. This is a particular advantage over battery storage devices. In a preferred embodiment the energy storage facility comprises an adaptable number of energy storage modules connected to each other each comprising multiple flywheels. The general setup of an energy storage device comprising flywheel is known be people skilled in the art. The number and type of the used flywheels determine the capacity of the energy storage facility and might be adapted to the required capacity to be operated together with a certain thermal power generation facility. More flywheels provide a higher overall capacity. In a preferred embodiment the energy storage facility comprises an adaptable number of energy storage modules connected to each other each comprising multiple flywheels. The modular setup enables fast and flexible modifications of the provide capacity of the energy storage facility. The energy storage modules might be electrically connected in parallel to each other within the energy storage facility.

In a further embodiment the combined electrical power plant (1) further comprises a communication interface to be connected to an external control system to receive the demand signal from the external control system. The communication interface denotes any suitable interface to receive data from a remote location. The remote location might be connected to the communication interface via a data cable or wireless via a mobile network, a computer network or any other suitable connection. The external control system may denote an operator operating the grid, a central power demand control unit observing deviations from supplied amount of power and power load of the grid or a system, where customers can order power.

The invention further relates to a method to operate a combined electrical power plant according to the present invention being connected to an electrical grid to supply electrical power to the grid comprising thermal power generation facility having a response time to supply a demanded amount of electrical power to the grid, which is limited by a thermal process, and an energy storage facility with a suitable energy storage capacity being able to supply additional electrical power to the grid and to receive and store electrical power from the thermal power generation facility or from the grid, both facilities are electrically coupled providing a combined power output to the grid in accordance to a demand signal specifies the demanded amount of power as a function of time between a first and a second point of time to be supplied to the grid, comprising the steps of processing the received demand signal and generating at least a first control signal and a second control signal from the demand signal by a plant controller, where the first control signal is a smoothened function of time of the demand signal resulting from a smoothening process executed by the plant controller taking into account operational characteristics of the thermal power generation facility to operate the thermal power generation facility under optimized conditions, and where the second control signal is adapted to provide the combined power output in accordance to the demand signal;

transmitting the first control signal to the thermal power generation facility and supplying power to the grid in accordance with the first control signal by the thermal power generation facility;

transmitting the second control signal to the energy storage facility and supplying or receiving power in accordance to the second control signal, where the capacity of the energy storage facility is adapted to nominal power and ramp rate characteristics of the thermal power generation facility; and providing the combined power output to the grid in accordance to the demand signal, where differences between combined power output and the demand signal are at least minimized at any point in time between the first and second points of time.

In an embodiment of the method the smoothening process is repeated until the resulting first control signal provides response rates, power ramp rates and/or comprises nominal power values achievable with the thermal power generation facility within normal operation conditions and operation dynamics of the thermal power generation facility.

In an embodiment the method comprises the steps of receiving load data send-out by the energy storage facility about the current energy stored in the energy storage facility by the plant controller connected to the energy storage facility via a data connection as a load feedback signal, preferably the load feedback signal is received periodically; and taking into account the load feedback signal for the smoothening process for generating the first and second control signals, preferably adapting the first control signal between first and second point in time in order to achieve a level of energy stored in the energy storage facility above a lower threshold value at least at the second point of time.

In an embodiment of the method, where the combined electrical power plant comprises a point of connection to establish an electrical connection to the grid for providing the combined power output, wherein the point of connection is connected via a first power line to the thermal power generation facility and via a second power line to the energy storage facility, the method further comprises the steps of monitoring the power supplied to the first power line by the thermal power generation facility by at least one measuring unit connected to the plant controller;

provide a first power line feedback signal to the plant controller by the first measuring unit connected to the plant controller via another data connection, preferably the first power line feedback signal is provided periodically or continuously to the plant controller; and suitably adapting at least the second control signal in response to the first power line feedback signal in order to minimize differences between demand signal and the provided combined power output.

In an embodiment the method further comprises the steps of
- starting a ramping up phase of the thermal power generation facility according to the first control signal at a starting point of time earlier than the first point of time and storing the generated power in the energy storage facility until the first point of time is reached, where the starting point of time depends on ramp rate of the thermal power generation facility and level of energy stored in the energy storage facility;
- supplying the power generated by the thermal power generation facility according to the first control signal to the grid after the first point in time; and
- additionally supplying at least the energy stored in the energy storage facility to the grid at least between the first point of time and the point of time, when the thermal power generation facility finished the ramping up phase.

The presence of an energy storage facility enables to start the ramp up the thermal power generation facility before the first point of time defining the point of time, when the combined electrical power plant shall supply power to the grid. Therefore the power provided by the thermal power generation facility at the first point in time is higher than for conventional power plants starting at zero at the first point in time, which will effectively reduced the ramp rate (effective ramp rate) of the thermal power generation facility denoting the time required for reaching the demand power output. The effective ramp rate denotes the time between the first point n time and the time, where the power output of the thermal power generation facility reaches its demanded value, while the (full) ramp rate extends from starting ramping up until the time, when the power output of the thermal power generation facility reaches its demanded value. Furthermore the power generated prior to the first point in time is not wasted, but stored in the energy storage facility and is used at the first point in time and later to boost the ramping up phase by supplying this previously stored energy as additional power to the combined power output during the ramping up phase.

In an embodiment the method further comprises the step of reducing the amount of energy stored in the energy storage facility to a lower threshold level before starting the ramping up phase of the thermal power generation facility. A low storage level in the energy storage facility enables the thermal power generation facility to start ramping up prior to the first point in time even earlier, because the creased integral amount of generated power prior to the first point in time can be stored in the energy storage facility. This will even reduce the effective ramp rate for the thermal power generation facility

BRIEF DESCRIPTION OF THE DRAWINGS

The aforementioned and other aspects of the invention will also be apparent from and elucidated with reference to the embodiments of the invention described herein after making reference to the drawings.

DETAILED DESCRIPTION OF EMBODIMENTS

Figure 1:
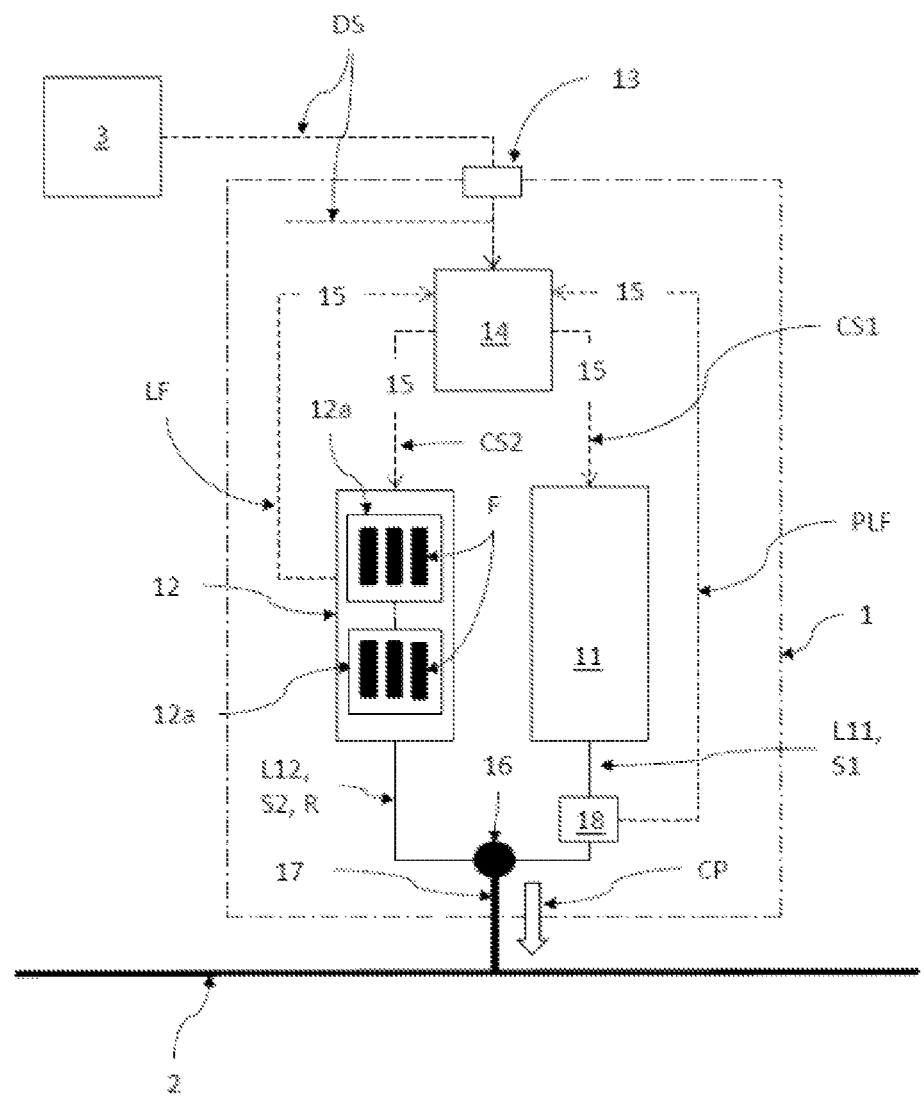
FIG. 1: shows an embodiment of the combined electrical power plant according to the present invention.

FIG. 1 presents an embodiment of the combined electrical power plant 1, which is connected via a point of connection 16 and an electrical connection 17 to the electrical grid 2 to supply a combined power output CP to the grid 2. The combined electrical power plant 1 comprises a thermal power generation facility 11 to supply S1 a certain amount of electrical power to the grid 2, and an energy storage facility 12 with a suitable energy storage capacity C to either supply S2 additional electrical power to the grid 2 or to receive R and store electrical energy (power) from the thermal power generation facility 11 or from the grid 2. Both facilities 11, 12 are electrically coupled at least via the point of connection 16, which is connected via a first power line L11 to the thermal power generation facility 11 and via a second power line L12 to the energy storage facility 12 to provide a combined power output CP to the grid 2 in accordance to a demand signal DS specifying the demanded amount of power DP as a function of time between a first and a second point of time T1, T2 to be supplied to the grid 2 by the combined electrical power plant 1. The demand signal may be transmitted from the combined power plant 1 to the plant controller 14 as a power plant schedule eventually further comprising the signal corresponding to a demanded operation reserve or may be received from an external source 3. The second power line L12 may comprise one or more transformers (not shown here) to increase the power level of the energy storage facility of typically 400 v to typically 110 kV of the first power line. The combined electrical power plant 1 may further comprises a communication interface 13 connected to a control system 3 in order receive the demand signal DS or parts of the demand signals (e.g. the signal specifying the operation reserve to be supplied) from the control system 2. The plant controller 14 of the combined electrical power plant 1 processes the demand signal DS and generates at least a first control signal CS1 and a second control signal CS2 from the demand signal DS, where the first control signal CS1 is a smoothened function of time of the demand signal DS resulting from a smoothening process SP executed by the plant controller 14 taking into account operational characteristics of the thermal power generation facility 11 to operate the thermal power generation facility 11 under improved conditions, in ideal cases under optimum conditions. The first control signal CS1 and the second control signal CS2 are transmitted to the thermal power generation facility 11 to supply power to the grid 2 in accordance with the first control signal CS1, and to the energy storage facility 12 to supply S2 or to receive R power in accordance to the second control signal CS2 being adapted to provide the combined power output CP in accordance to the demand signal DS, respectively. The capacity C of the energy storage facility 12 is adapted to nominal power and ramp rate characteristics of the thermal power generation facility 11 in order to at least minimize differences between demand signal DS and the provided combined power output CP at any point in time between the first and second points of time T1, T2. The energy storage facility 12 shown in FIG. 1 comprises a plurality of flywheels F to supply or store the energy received from the thermal power generation facility 11 or from the grid 2. In this embodiment the energy storage facility 12 comprises an adaptable number of energy storage modules 12a (here indicated by two modules) connected to each other each comprising multiple flywheels (F) (here indicated by three bold bars F per module 12*a*). The thermal power generation facility 11 is a coal-fired power station or a gas fired power station or a nuclear power station having a maximum output power of more than 5 MW. Correspondingly, the max. power of the energy storage facility should be at least 1 MW.

In this embodiment the plant controller 14 is furthermore connected to the energy storage facility 12 via a data connection 15 receiving load data send-out by the energy storage facility 12 about the current energy stored in the energy storage facility 12 as a load feedback signal LF and takes into account the load feedback signal LF within the smoothening process for generation of first and second control signals CF1, CF2. The load feedback signal LF might be send-out and received periodically. In another embodiment the data connection 15 for the load feedback signal LF might be the same data connection 15 for transmitting the second control signal CS2. In this embodiment the combined electrical power plant 1 further comprises one measuring unit 18 connected to the plant controller 14 to monitor the power S1 in the first power line L11 supplied by the thermal power generation facility 11. Here the measuring unit 18 is connected to the plant controller 14 via another data connection 15 and provides a first power line feedback signal PLF to the plant controller 14, which is arranged to adapt at least the second control signal CS2 in response to the first power line feedback signal PLF in order to minimize differences between demand signal DS and the provided combined power output CP. In an embodiment the first another power line feedback signal PLF is provided periodically or continuously to the plant controller 14.

Figure 2:
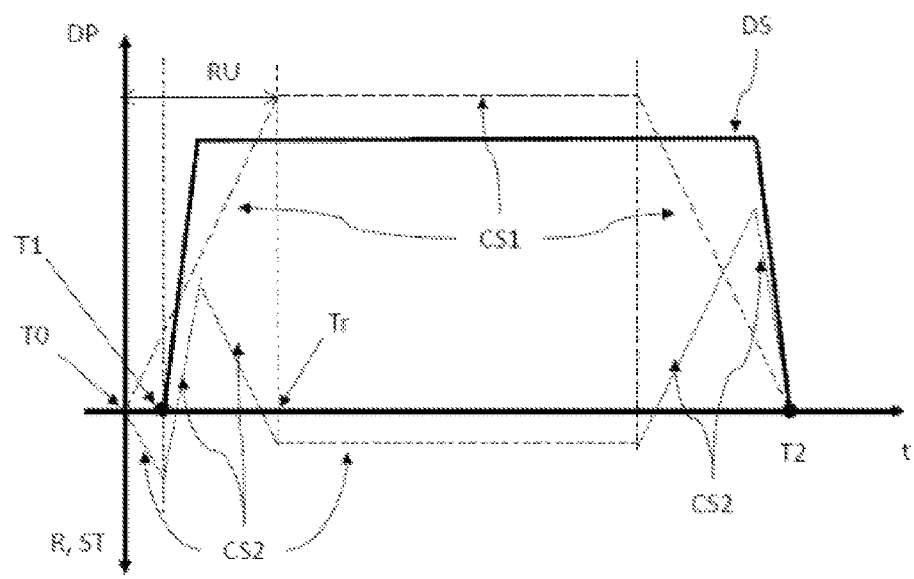
FIG. 2: shows an example of a possible demand signal and corresponding first and second control signals.

FIG. 2 shows an example of a possible demand signal DS (solid line between T1 and T2. T1 and T2 are indicated by solid circles on the x-axis) and corresponding first and second control signals CS1 and CS2 (both indicated by long dashed lines) shown as graph with the x-axis as the time axis t and the y-axis as the demanded/provided power axis DP. The demand signal DS comprises a steep ramping up in a limit time interval after first point in time T1 followed by a demanded constant power and finished again be a steep ramping down to zero at the second point in time T2. In order to provide a combined power output CP in the time interval between T1 and T2, the plant controller 14 generates suitable first and second control signals CS1 and CS2. In this example, the ramping up phase RU of the thermal power generation facility 11 starts according to the first control signal CS1 at a starting point of time T0 earlier than the first point of time T1. The generated power between T0 and T1 is fully stored in the energy storage facility 12, where the starting point of time T0 depends on ramp rate of the thermal power generation facility 11 and level of energy LSE stored in the energy storage facility 12. After having passed the first point in time T1 the power generated by the thermal power generation facility 11 according to the first control signal CS1 is supplied S1 to the grid 2. The energy storage facility 12 supplies simultaneously additional energy/power S2 to the grid 2 the first point of time T1 and the point of time Tr, when the thermal power generation facility 11 finished the ramping up phase RU. In this particular embodiment, the additional power supply S2 of the energy storage facility 12 ends earlier, because the first control signal CS1 is generated taking into account a lower threshold value LTV of energy stored in the energy storage facility 12, which shall be exceed at least at the second point of time T2. To be able to load the energy storage facility 12, the first control signal CS1 is adapted to supply S1 more power than supplied as combined power output to the grid, where the exceed power is stored in the energy storage facility 12.

Figure 3:
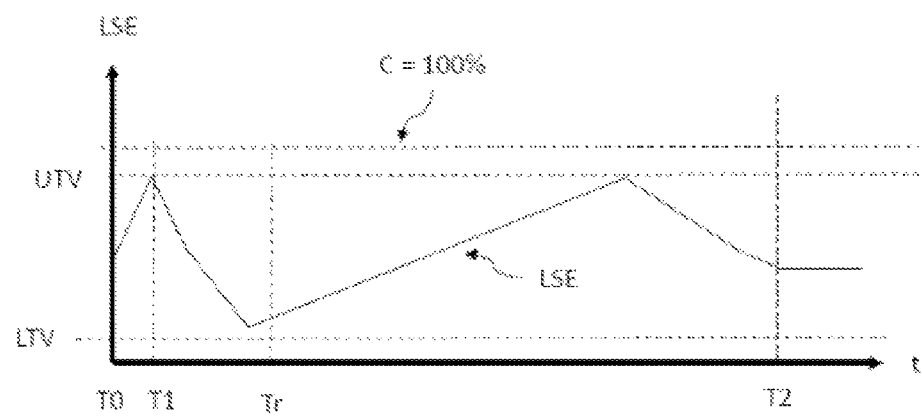
FIG. 3: shows an example of the level of energy stored in the energy storage facility as a function of time.

FIG. 3 shows an example of the level of energy LSE stored in the energy storage facility 12 as a function of time, where the shown curve shall be considered in relation to FIG. 2. The plant controller 14 adapts the first control signal CS1 between first and second point in time T1, T2 to achieve a level of energy LSE stored in the energy storage facility 12 above a lower threshold value LTV at least at the second point of time T2 (here during the complete time interval between T1 and T2, where the level LSE is adapted to 40-60% of the capacity C of the energy storage facility 12 after passing the second point in time T2. In a further embodiment not shown here the amount of energy stored in the energy storage facility 12 might be reduced to the lower threshold level LTV before starting the ramping up phase RU of the thermal power generation facility 11. In this embodiment the plant controller 14 further adapts the first control signal CS1 between first and second point in time T1, T2 to achieve a level of energy LSE stored in the energy storage facility 12 below an upper threshold UTV value at least at the second point of time T2. The level of stored energy LSE should not exceed the upper threshold value UTV in order to be able to provide an operational reserve in case of power supply to the grid 2 exceeds the power load from the grid 2.

Figure 4:
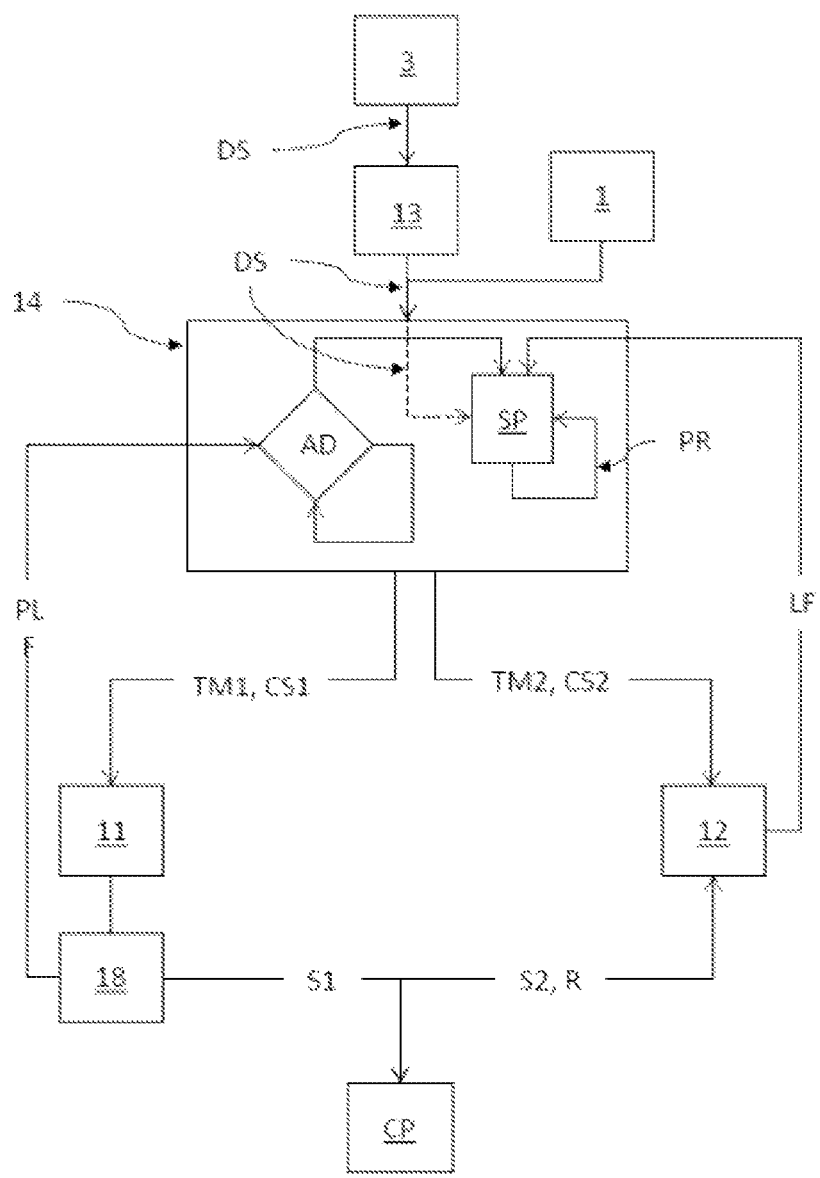
FIG. 4: shows an embodiment of the method to operate the combined electrical power plant according to the present invention.

FIG. 4 shows an embodiment of the method to operate the combined electrical power plant 1 according to the present invention. The demand signal DS is received either from a control system 3 via a communication interface 13 of the combined electrical power plant 1 connected to the control system 3 or from the combined electrical power plant 1 itself. FIG. 4 comprises both alternatives for a better overview. Independently from the unit 1, 3 transmitting the demand signal DS to the plant controller 14, the received demand signal DS is processed in the plant controller 14 to generate at least a first control signal CS1 and a second control signal CS2 from the demand signal DS, where the first control signal CS1 is a smoothened function of time of the demand signal DS resulting from a smoothening process SP executed by the plant controller 14 taking into account operational characteristics of the thermal power generation facility 11 to operate the thermal power generation facility 11 under optimized conditions. The smoothening process SP applies a suitable filter algorithm, where at least one element of the group of band-pass filter, low-pass filter, high-pass filter, look-up tables, averaging the demand signal in sub-time ranges might be used. Furthermore the smoothening process SP is repeated until the resulting first control signal CS1 provides response rates, power ramp rates and/or comprises nominal power values achievable with the thermal power generation facility 11 within normal operation conditions and operation dynamics of the thermal power generation facility 11. In another embodiment the first control signal CS1 is further adapted to minimize the $CO_2$-Emission of the combined electrical power plant 1 during power generation to supply power in accordance to the demand signal DS. The second control signal CS2 is adapted to provide the combined power output CP in accordance to the demand signal DS followed by transmitting TM1 the first control signal CS1 to the thermal power generation facility 11 supplying S1 power to the grid 2 in accordance with the first control signal CS1 and by transmitting the second control signal CS2 to the energy storage facility 12 supplying S2 or receiving R power in accordance to the second control signal CS2 with a capacity C of the energy storage facility 12 adapted to nominal power and ramp rate characteristics of the thermal power generation facility 11. During this procedure the plant controller 14 receives load data as a load feedback signal LF send-out by the energy storage facility 12 about the current energy stored in the energy storage facility 12, which is connected to the energy storage facility 12 via a data connection 15. Preferably the load feedback signal LF is received periodically. The plant controller 14 takes into account the load feedback signal LF for the smoothening process SP for generating the first and second control signals CS1, CS2 to adapt the first control signal CS1 between first and second point in time T1, T2 in order to achieve a level of energy LSE stored in the energy storage facility 11 above a lower threshold value LTV at least at the second point of time T2. Furthermore the power supplied S1 to the first power line L11 by the thermal power generation facility 11 is monitored by at least one measuring unit 18 connected to the plant controller 14 providing a first power line feedback PLF signal to the plant controller 14 via another data connection 15, where the first power line feedback signal PLF might be provided periodically or continuously to the plant controller 14 followed by suitably adapting AD at least the second control signal CS2 in response to the first power line feedback signal PLF in order to minimize differences between demand signal DS and the provided combined power output CP. The generated first and second control signals CS1 and CS2 enable the combined electrical power plant 1 to provide the combined power output CP to the grid 2 in accordance to the demand signal DS, where differences between combined power output CP and the demand signal DS are at least minimized at any point in time between the first and second points of time T1, T2.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

LIST OF REFERENCE NUMERALS 1 combined electrical power plant
11 thermal power generation facility
12 energy storage facility
12a energy storage modules within the energy storage facility
13 communication interface
14 plant controller
15 data connection(s)
16 point of connection
17 electrical connection to the grid
18 measuring unit
2 (power, national, distribution, transmission) grid
3 control system operating the grid
AD adjusting the second control signal
C energy storage capacity of the energy storage facility
CP combined power output (to the grid)
CS1 first control signal
CS2 second control signal
DP demanded amount of power
DS demand signal (from grid control system)
F Flywheels
L11 first power line
L12 second power line
LF load feedback signal
LSE level of energy stored in the energy storage facility
LTV lower threshold value
M monitoring the power supplied to the first power line
PLF first power line feedback signal
PR processing the received demand signal by the plant controller
R the energy storage facility receives energy from the thermal power generation facility or the grid and stores the received energy
RU ramping up phase
S1 power supplied by the thermal power generation facility
S2 power supplied by the energy storage facility
SP smoothening process
ST storing the generated power before T1
t time axis in FIGS. 2 and 3
T0 point of time, when ramping up is started
T1 first point in time
T2 second point in time
Tr point of time, when ramping up phase is finished
TM1 transmitting the first control signal
TM2 transmitting the second control signal
UTV upper threshold value

What is claimed is:

1. A combined electrical power plant connected to an electrical grid to supply electrical power to the grid comprising a thermal power generation facility, where power is generated from fossil fuels or radioactive material utilizing steam turbines, having a response time denoting the time to ramp-up the power from zero output to a demanded output to supply a demanded amount of electrical power to the grid, which is limited by a thermal process denoting a transformation of energy stored in the fossil fuels or radioactive material into pressurized steam passing the steam turbine in order to generate electrical current, an energy storage facility with a suitable energy storage capacity being able to supply additional electrical power to the grid and to receive and store electrical power from the thermal power generation facility or from the grid, both facilities are electrically coupled to provide a combined power output to the grid according to a demand signal specifying the demanded amount of power as a function of time between a first and a second point of time to be supplied to the grid, and a plant controller to process the demand signal and to generate at least a first control signal and a second control signal from the demand signal, where the first control signal is a smoothened function of time of the demand signal resulting from a smoothening process executed by the plant controller taking into account operational characteristics of the thermal power generation facility to operate the thermal power generation facility under improved conditions, and to transmit the first control signal to the thermal power generation facility to supply power to the grid in accordance with the first control signal, and to transmit the second control signal to the energy storage facility to supply or to receive power in accordance to the second control signal being adapted to provide the combined power output in accordance to the demand signal, where the capacity of the energy storage facility is adapted to nominal power and ramp rate characteristics of the thermal power generation facility, where the ramp rate denotes the time for the thermal power generation facility required for reaching the demanded power output, in order to at least minimize differences between demand signal and the provided combined power output at any point in time between the first and second points of time.

2. The combined electrical power plant according to claim 1, wherein the smoothening process applies a filter algorithm using at least one element of the group of band-pass filter, low pass filter, high-pass filter, look-up tables, averaging the demand signal in sub-time ranges.

3. The combined electrical power plant according to claim 2, wherein the smoothening process is repeated until the resulting first control signal provides response rates, power ramp rates and/or comprises nominal power values achievable with the thermal power generation facility within normal operation conditions and operation dynamics of the thermal power generation facility.

4. The combined electrical power plant according to claim 2, wherein the first control signal is adapted to minimize the CO2-Emission of the combined electrical power plant during power generation to supply power in accordance to the demand signal.

5. The combined electrical power plant according to claim 1, wherein the plant controller is connected to the energy storage facility via a data connection receiving load data send-out by the energy storage facility about the current energy stored in the energy storage facility as a load feedback signal and takes into account the load feedback signal within the smoothening process for generation of first and second control signals.

6. The combined electrical power plant according to claim 5, wherein the load feedback signal is send-out and received periodically.

7. The combined electrical power plant according to claim 5, wherein the plant controller adapts the first control signal between first and second point in time to achieve a level of energy stored in the energy storage facility above a lower threshold value at least at the second point of time.

8. The combined electrical power plant according to claim 7, wherein the plant controller further adapts the first control signal between first and second point in time to achieve a level of energy stored in the energy storage facility below an upper threshold value at least at the second point of time.

9. The combined electrical power plant according to claim 8, wherein the level is adapted to 40-60% of the capacity of the energy storage facility after the thermal power generation facility passed a ramp-up phase, at least after passing the second point in time.

10. The combined electrical power plant according to claim 1, further comprising a point of connection to establish an electrical connection for providing the combined power output to the grid, wherein the point of connection is connected via a first power line to the thermal power generation facility and via a second power line to the energy storage facility, further comprising at least one measuring unit connected to the plant controller to monitor the power in the first power line supplied by the thermal power generation facility and being connected to the plant controller via another data connection to provide a first power line feedback signal to the plant controller, which is arranged to suitably adapt at least the second control signal in response to the first power line feedback signal in order to minimize differences between demand signal and the provided combined power output.

11. The combined electrical power plant according to claim 10, wherein the first power line feedback signal is provided periodically or continuously to the plant controller.

12. The combined electrical power plant according to claim 1, wherein the energy storage facility comprises a plurality of flywheels to supply or store the energy received from the thermal power generation facility or from the grid.

13. The combined electrical power plant according to claim 12, wherein the energy storage facility comprises an adaptable number of energy storage modules connected to each other, each comprising multiple flywheels.

14. The combined electrical power plant according to claim 1, wherein the thermal power generation facility is one element of the group of coal-fired power station, gas fired power station or nuclear power station.

15. The combined electrical power plant according to claim 14, wherein the thermal power generation facility has a maximum output power of more than 5 MW.

16. The combined electrical power plant according to claim 1, wherein where the combined electrical power plant further comprises a communication interface to be connected to a external control system to receive the demand signal from the external control system.

17. A method to operate a combined electrical power plant connected to an electrical grid to supply electrical power to the grid comprising thermal power generation facility, where power is generated from fossil fuels or radioactive material utilizing steam turbines, having a response time denoting the time to ramp-up the power from zero output to a demanded output to supply a demanded amount of electrical power to the grid, which is limited by a thermal process denoting a transformation of energy stored in the fossil fuels or radioactive material into pressurized steam passing the steam turbine in order to generate electrical current, and an energy storage facility with a suitable energy storage capacity being able to supply additional electrical power to the grid and to receive and store electrical power from the thermal power generation facility or from the grid, both facilities are electrically coupled providing a combined power output to the grid in accordance to a demand signal specifies the demanded amount of power as a function of time between a first and a second point of time to be supplied to the grid, comprising:

processing the received demand signal and generating at least a first control signal and a second control signal from the demand signal by a plant controller, where the first control signal is a smoothened function of time of the demand signal resulting from a smoothening process executed by the plant controller taking into account operational characteristics of the thermal power generation facility to operate the thermal power generation facility under optimized conditions, and where the second control signal is adapted to provide the combined power output in accordance to the demand signal;

transmitting the first control signal to the thermal power generation facility and supplying power to the grid in accordance with the first control signal by the thermal power generation facility;

transmitting the second control signal to the energy storage facility and supplying or receiving power in accordance to the second control signal, where the capacity of the energy storage facility is adapted to nominal power and ramp rate characteristics of the thermal power generation facility, where the ramp rate denotes the time for the thermal power generation facility required for reaching the demanded power output; and providing the combined power output to the grid in accordance to the demand signal, where differences between combined power output and the demand signal are at least minimized at any point in time between the first and second points of time.

18. The method according to claim 17, where the smoothening process is repeated until the resulting first control signal provides response rates, power ramp rates and/or comprises nominal power values achievable with the thermal power generation facility within normal operation conditions and operation dynamics of the thermal power generation facility.

19. The method according to claim 17, further comprising:
receiving load data send-out by the energy storage facility about the current energy stored in the energy storage facility by the plant controller connected to the energy storage facility via a data connection as a load feedback signal; and
taking into account the load feedback signal for the smoothening process for generating the first and second control signals.

20. The method according to claim 19, further comprising adapting the first control signal between first and second point in time in order to achieve a level of energy stored in the energy storage facility above a lower threshold value at least at the second point of time.

21. The method according to claim 19, where the load feedback signal is received periodically.

22. The method according to claim 17, wherein the combined electrical power plant comprises a point of connection to establish an electrical connection to the grid for providing the combined power output, wherein the point of connection is connected via a first power line to the thermal power generation facility and via a second power line to the energy storage facility, further comprising:
monitoring the power supplied to the first power line by the thermal power generation facility by at least one measuring unit connected to the plant controller;
provide a first power line feedback signal to the plant controller by the first measuring unit connected to the plant controller via another data connection; and
suitably adapting at least the second control signal in response to the first power line feedback signal in order to minimize differences between demand signal and the provided combined power output.

23. The method according to claim 22, where the first power line feedback signal is provided periodically or continuously to the plant controller.

24. The method according to claim 17, further comprising:
starting a ramping up phase of the thermal power generation facility according to the first control signal at a starting point of time earlier than the first point of time and storing the generated power in the energy storage facility until the first point of time is reached, where the starting point of time depends on ramp rate of the thermal power generation facility and level of energy stored in the energy storage facility;
supplying the power generated by the thermal power generation facility according to the first control signal to the grid after the first point in time; and
additionally supplying at least the energy stored in the energy storage facility to the grid at least between the first point of time and the second point of time, when the thermal power generation facility finished the ramping up phase.

25. The method according to claim 24, further comprising reducing the amount of energy stored in the energy storage facility to a lower threshold level before starting the ramping up phase of the thermal power generation facility.

26. The method according to claim 17, further comprising receiving the demand signal from an external control system via a communication interface of the combined electrical power plant connected to the external control system.

* * * * *